United States Patent [19]

Bulson et al.

[11] 4,115,423

[45] Sep. 19, 1978

[54] PROCESS FOR PRODUCING METAL HALIDE-AMIDE REACTION PRODUCT

[75] Inventors: Walter T. Bulson; Peter A. Christie; James R. Jones, all of Lancaster, Pa.

[73] Assignee: Armstrong Cork Company, Lancaster, Pa.

[21] Appl. No.: 723,266

[22] Filed: Sep. 14, 1976

[51] Int. Cl.$^2$ ................................................ C07F 7/28
[52] U.S. Cl. ............................ 260/429.5; 260/429 R; 260/429.3
[58] Field of Search .............. 260/429.5, 429.3, 429 R

[56] References Cited

U.S. PATENT DOCUMENTS

| | | | |
|---|---|---|---|
| 2,371,100 | 3/1945 | Kaiser et al. | 260/429 R X |
| 2,480,814 | 8/1949 | Punshon et al. | 260/429 R X |
| 2,849,420 | 8/1958 | Stevens et al. | 260/429 R X |
| 3,210,278 | 10/1965 | Ryer et al. | 260/429 R X |
| 3,787,368 | 1/1974 | Lander | 260/67.6 R |
| 4,067,893 | 1/1978 | Lander | 260/429.3 |

OTHER PUBLICATIONS

Canadian Journal of Chemistry, V10, pp. 2234–2242, (1962).
Chemical Abstracts, 70, 3183t, (1969).
Chemical Abstracts, 64, 9219b.
Chemical Abstracts, 64, 1663c.
Chemical Abstracts, 64, 13806g.
Chemical Abstracts, 63, 3868a.
Chemical Abstracts, 67, 37853g.
Archambault et al., Canadian J. Chem., V36, 1461–1466, (1958).
Gerrard, J. Chem. Soc., 2141–2144, (1960).
Chemical Abstracts, 78, 51890h, (1973).
Chemical Abstracts, 55, 13055d, (1961).
Chemical Abstracts, 52, 10693b, (1958).
Chemical Abstracts, 52, 11643h, (1958).
Chemical Abstracts, 51, 9311f, (1957).
Chemical Abstracts, 55, 25731f, (1961).

*Primary Examiner*—Helen M. S. Sneed
*Attorney, Agent, or Firm*—Sughrue, Rothwell, Mion, Zinn and Macpeak

[57] ABSTRACT

A process for the preparation of a metal halide-amide reaction product, useful in the preparation of metal-modified amide-aldehyde polymers, which comprises (1) reacting in a water-immiscible inert liquid medium a metal halide with at least one amide having at least two replaceable hydrogens to obtain a reaction product therebetween;

(2) hydrolyzing the reaction product obtained in step (1) above with water to form an aqueous solution of the reaction product;

(3) partially neutralizing the aqueous solution of the reaction product obtained in step (2) with a bicarbonate, and (4) recovering the metal halide-amide reaction product obtained.

18 Claims, No Drawings

PROCESS FOR PRODUCING METAL HALIDE-AMIDE REACTION PRODUCT

BACKGROUND OF THE INVENTION

1. Field of the Invention

This invention relates to a process for the preparation of a component useful in producing polymer products and more specifically to a process for the preparation of a metal halide-amide reaction product, useful in producing amide-aldehyde polymers which can be advantageously used in structural members, as adhesives, in laminates, and insulation materials.

2. Description of the Prior Art

The use of polymer products, in particular as binders or adhesives, in construction and building materials is well known in the art. A large number of patents disclose polymeric materials useful in the production of structural members, building materials, ornamental members, as adhesives, etc. Various classes of polymeric products are employed in order to obtain various chemical and physical properties in the ultimate products produced.

One particularly useful class of polymeric materials includes the condensation product of an amide and an aldehyde. U.S. Pat. No. 3,787,368 discloses polymeric products and a process for the production thereof, these polymeric products being prepared by polymerizing an organic compound containing at least two labile hydrogens in the presence of a zirconium, hafnium or titanium halide. Suitable examples of organic compounds containing at least two labile hydrogen atoms disclosed include amides, aminoplasts, carboxylic acids, polyhydroxy compounds and other compounds capable of forming reactive complexes with zirconium, hafnium and titanium halides. The disclosure is that the reactive complex of these compounds with zirconium, hafnium and titanium halides is produced simply by mixing the components or by mixing the components in the presence of water.

Unfortunately, a large number of disadvantages occur in the preparation of these reactive complexes described in the above mentioned patent since if the components are simply mixed, particularly as solids, to achieve a reaction, an intimate contact of the individual components is not obtained. Further, if water is employed in order to increase the intimate contact of the components to produce the complex reaction product, fuming occurs with the release of noxious hydrogen halide gases with a simultaneous marked increase in temperature of the reaction system. This gives rise to problems with respect to environmental pollution in the release of gaseous hydrogen halides since the equipment employed must be designed to eliminate or at least minimize release of such into the atmosphere. In addition, due to the corrosive nature of hydrogen halides, the equipment employed must be corrosion resistant. Further, due to the marked increase in temperature which occurs, both a very slow addition of reactants is necessary which is disadvantageous from a commercial standpoint but also the equipment designed to handle higher than normal temperatures is necessary.

Further, when the components of the reaction system are simply mixed, i.e., where water is not used as a reaction medium, to improve the contact between the comparator being reacted, it is necessary to heat the system, particularly where the organic compound containing these two labile hydrogen atoms is not a liquid, at normal temperatures. This additionally is disadvantageous from a commercial standpoint because of the energy requirements to initially heat the components and subsequently cool the reaction product system to normal temperatures of operation.

While the reaction product between the organic compound containing at least two labile hydrogen atoms with the zirconium, hafnium or titanium halide when subsequently reacted with an aldehyde to produce polymer products, results in the production of useful polymer materials, the disadvantages described above are quite important, particularly from a commercial standpoint. Elimination or at least minimization of these disadvantages has been desired.

SUMMARY OF THE INVENTION

An object of this invention is to provide a reaction product useful in the preparation of advantageous polymeric materials.

A further object of this invention is to provide a component useful in the production of polymeric materials.

An even further object of this invention is to provide a process for the preparation of a reactive reaction product between labile hydrogen atom containing compounds and zirconium, hafnium and titanium, particularly titanium, halides in which the problems encountered in the prior art process, discussed above, are overcome.

A further object of this invention is to provide a process for the preparation of a polymer component useful in the production of metal modified amide-aldehyde polymer products in which environmental pollution problems are minimized.

A still further object of this invention is to provide a process for the preparation of a component, useful in producing metal modified amide-aldehyde polymer products in a commercially advantageous process.

These and other objects of the invention are accomplished by the process of this invention for the preparation of a metal halide-amide reaction product which comprises (1) reacting in a water-immiscible inert liquid medium a metal halide with at least one amide having at least two replaceable hydrogens to obtain a reaction product therebetween;

(2) hydrolyzing the reaction product obtained in step (1) above with water to form an aqueous solution of the reaction product;

(3) partially neutralizing the aqueous solution of the reaction product obtained in step (3) with a bicarbonate, and (4) recovering the metal halide-amide reaction product obtained.

DETAILED DESCRIPTION OF THE INVENTION

As described above, in the process of this invention, a reactive reaction product between a metal halide with at least one amide is prepared in the presence of a water-immiscible inert liquid medium.

Suitable examples of metal halides which can be employed include those metal halides of Group IVb which are soluble in inert organic liquid media and which react vigorously with water. Specific examples include, in particular, metal halides of titanium, zirconium, and hafnium. Suitable specific examples include zirconium tetrahalides such as zirconium tetrachloride and titanium tetrahalides such as titanium tetrachloride, titanium tetrabromide and titanium tetrafluoride. The process of this invention is quite advantageous for titanium tetrachloride, titanium tetrabromide and titanium tetrafluoride, and in particular for titanium tetrachloride. Other examples of titanium halides which can be employed include alkoxy, aryloxy or acyloxytitanium halides of the formula $(RO)_nTiCl_{4-n}$, where $n$ is 1 to 3 and R is alkyl, aryl, acyl, aroyl or mixtures thereof where such compounds react vigorously or exothermically with water.

Suitable examples of amides which can be employed include not only amides but also aminoplasts. Such can be suitably used if they are endothermally soluble in water. Specific examples of these materials are those amides or aminoplasts containing at least two labile hydrogen atoms such as urea, mono- and di-substituted ureas, cyclic ureas, thiourea, guanidine, semicarbazide, etc., and mixtures thereof can be employed. Urea is preferred as the amide. The term "amide" is used herein for simplicity to describe all materials disclosed in detail above. Suitable amide materials which can be used include those specifically described in U.S. Pat. No. 3,787,368, which disclosure is herein incorporated by reference.

The term "water-immiscible inert liquid medium" is used herein to describe any inert liquid which is substantially water-immiscible. The only requirement for substantial water immiscibility is that such inert liquid and water when mixed and allowed to stand will separate into a water layer and an inert liquid medium layer. Suitable examples of water-immisicible inert liquid media which can be employed include any liquid miscible with but inert to the metal halide used. Examples of such liquids include aliphatic or aromatic hydrocarbons and their halogenated derivatives. A liquid having a high vapor pressure is in general preferred but a liquid having a low vapor pressure can be advantageously used as well. Specific examples of aliphatic hydrocarbons include pentane, hexane, petroleum ether, ligroin, kerosene, and cyclohexane. Specific examples of aromatic hydrocarbons include benzene, toluene, xylene, ethylbenzene, cumene, cymene, and mesitylene. Halogenated hydrocarbons which can be suitably used include methylene chloride, chloroform, carbon tetrachloride, trichloroethane, amyl chloride, chlorinated kerosene, chlorobenzene, dichlorobenzene, methylene bromide, bromobenzene, and fluorinated hydrocarbons, e.g., fluorobenzene, dibromotetrafluoroethane, perchloroethylene, fluorotrichloromethane, trichlorotrifluoroethanes, and difluorotetrachloroethane. Mixtures of these inert liquids can be used, if desired, as the water-immiscible inert liquid media. Aromatic hydrocarbons are preferred and benzene is particularly preferred. Inert liquid media which form azeotropes with water are particularly preferred.

Suitable proportions of the metal halide to the amides which can be employed are molar proportions ranging from about 1:100 to 1:2, preferably 1:35 to 1:3.5. Use of a molar proportion of less than about 1:100 does not result in the formation of a suitable amount of the reaction product while it is not desirable to use a molar proportion greater than 1:2, since a large amount of heat is generated, particularly when the reaction product obtained is added subsequently to water in the hydrolysis of the reaction product of the amide and the metal halide.

The proportion of the reactants to the water-immiscible inert liquid medium is not critical and can be varied. Although the weight ratio of the reactants to the water-immiscible inert liquid medium is not critical, ratios of about 1:0.8 to 1:4 of the reactants to the water-immiscible inert liquid medium is preferred from the standpoint of controlling the viscosity of the reaction mixture and minimizing any fuming of hydrogen halides which are generated. Higher liquid medium to reactant weight ratios are preferred since the reaction mixture is more fluid. A preferred weight ratio is a liquid medium to reactant ratio of at least 1:1.

In preparing the reaction system employed in the process of this invention, the metal halide or the amide, in the form of a powder, can be initially added to the water-immiscible inert liquid medium or alternatively the amide, followed by the metal halide, can be added to the inert liquid medium. If desired, the metal halide and the amide can be added to the water-immiscible inert liquid medium simultaneously. The reaction system is simply stirred using conventional means of agitation to achieve the reaction to form the reaction product and a suitable reaction temperature can range from about 0° C. to about 40° C., preferably at ambient room temperatures (e.g., about 20° to 30° C.). Temperatures higher than about 40° C. give rise to a highly colored product which is not preferred and lead to the formation of a stable emulsion which is not desirable in the hydrolysis step to be disclosed hereinafter. Conventional mixing means can be employed to achieve the mixing.

The reaction of the metal halide with the amide in the inert liquid medium is to a certain extent dependent on the liquid medium used but in general is completed substantially instantaneously to within 2 to 3 hours to form a slurry of the reaction product suspended in the inert liquid medium. Stirring for about 5 to 30 minutes after reactant addition completion is generally employed to ensure the reaction is complete.

In the second step of the process of this invention, the reaction product obtained in step (1), i.e., the reaction product of the metal halide and the amide obtained, suspended in the inert liquid medium, is simply reacted with water to form an aqueous solution of this reaction product. To achieve the hydrolysis with water, water is added to the water-immiscible inert liquid medium containing the reaction product and the mixture stirred sufficiently to accomplish hydrolysis of the reaction product. Alternatively, the slurry of the reaction product can be added to the water to achieve the hydrolysis. Addition of water to the reaction product mixture is preferred since such is easier to do.

A suitable weight proportion of the water which can be employed is that amount of water sufficient to dissolve the solid reaction product obtained and form an aqueous solution/water-immiscible inert liquid medium two-phase system. In general this amount of water can be easily determined by formation of a substantially colorless aqueous layer. Too little water is undesirable since all of the metal halide-amide reaction product is not dissolved out and too much water is not desired because a larger volume of solution is more difficult to handle.

Appropriate temperatures which can be employed during the hydrolysis range from about 10° C. to about 60° C. Conventional cooling means can be employed for operation within this range. Temperatures above 60° C are not preferred because expulsion of gaseous hydrogen halide, a by-product, from the system occurs. Hydrolysis is substantially instantaneous and is considered complete when a colorless aqueous layer is formed. Conventional mixing or agitation means can be employed during the hydrolysis to increase efficiency.

Once the aqueous solution of the reaction product prepared in step (1) is obtained in step (2), the aqueous solution containing the reaction product is then partially neutralized with a bicarbonate, e.g., a water-soluble bicarbonate such as sodium bicarbonate, potassium bicarbonate, ammonium bicarbonate, etc., neat or as an aqueous bicarbonate solution. The term partial neutralization is employed to describe neutralization of about one-half, e.g., 0.4 to 0.6 times, (molar basis) of the acidity of the system. A sufficient amount of the bicarbonate is employed to achieve this degree of neutralization. A bicarbonate saturated aqueous solution can be used but addition of powdered bicarbonate is preferred in general for the neutralization. The above bicarbonates are used as a neutralization agent because of the properties the ultimate metal halide-amide reaction product obtained has when used to produce metal-modified amide-aldehyde polymers described hereinafter. It was unexpected that these bicarbonates would provide these advantages when such were used to neutralize and that such are not obtained with other basic materials.

Control of temperature is not of concern in this neutralization step since the neutralization is endothermic and temperatures from about 10° C. to 60° C. can be employed in the neutralization step. In addition, the order of addition of the aqueous solution of the metal halide-amide reaction product and the bicarbonate is not of specific concern but where a bicarbonate as a solid is added, it is preferred to add such to the aqueous solution of the reaction product. Stirring or agitation is in general desirable to minimize localized concentration variations and to facilitate pH determinations.

In the above use of water to achieve hydrolysis in step (2) and the bicarbonate in step (3) to achieve neutralization the additives can be to the overall reaction system. More specifically in the hydrolysis with the water, the two-phase system comprising the slurry of the reaction product in the inert liquid medium can be used with water being added thereto. This results in step (2) in forming a two-phase system comprising a water-immiscible inert liquid medium, generally upper, layer and an aqueous solution, generally lower, layer. This two-phase system can then be partially neutralized in step (3) by the addition of the bicarbonate. No phase or layer separations are required to effect these steps and this is particularly advantageous in commercial operation. Appropriate techniques are, of course, employed for efficiency to ensure good agitation and mixing of these two-phase systems.

Once the reaction system comprising the upper water-immiscible inert liquid medium layer and the aqueous solution layer containing the metal halide-amide reaction product has been partially neutralized as described above in step (3) recovery of the metal halide-amide reaction product is accomplished in step (4). Simple liquid layer separation techniques can be employed, e.g., allowing the layers to separate and decanting off the upper layer or drawing off the lower layer to recover the aqueous solution of the metal halide-amide reaction product.

This aqueous solution of the metal halide-amide reaction product can then be used as a reactant with various aldehydes to produce valuable metal modified amide-aldehyde polymers, e.g., as disclosed in U.S. Pat. No. 3,787,368.

In addition to the above described steps of the process of this invention, an embodiment of the process can include removing any water from the water-immiscible inert liquid medium phase after the separation therefrom of the aqueous layer containing the metal halide-amide reaction product, and reuse of the water-immiscible inert liquid medium in the first step of the process of this invention. The removal of the water can be achieved by the addition of a drying agent such as calcium chloride or preferably by conducting an azeotropic distillation of the water-immiscible inert liquid medium phase. No special process conditions are required for the azeotropic distillation and those normally used can be employed, e.g., distillation under atmospheric or vacuum conditions at temperatures under which the azeotrope distills at the conditions employed. Once the water has been removed from the water-immiscible inert liquid, the water-immiscible inert liquid can be then recycled for reuse in step (1) of the process of this invention.

As described above, the process of this invention provides the ability to eliminate the fuming the violent reaction which occurs when reactive metal halides are reacted in water or an aqueous amide solution to produce the metal halide-amide reaction product. Further, the process of this invention provides the ability to minimize the evolution of reaction heat generally involved in the reaction when water or an aqueous amide solution is employed. In addition, the process of this invention provides the ability to eliminate control of temperature and rate of addition of the metal halide and to minimize undesirable precipitation of titanium oxides, when, for example, titanium tetrachloride is used, which occur when the temperature and rate of addition are not controlled. In particular, with respect to the first step of this process of this invention, the metal halide-amide reaction product which is produced is hydrolyzed easily with water to form an aqueous solution thereof and results in clear solutions. Also, the process of this invention eliminates fuming which occurs with the attendant hazards of the evolution of corrosive hydrogen halide or the production of titania smoke when reactive titanium halides are used. The process of this invention is advantageous in that the process of this invention eliminates or minimizes the need for any temperature control in the reaction of the metal halide and the amide and the reaction product obtained between the metal halide and the amide can be easily hydrolyzed, neutralized and recovered for use in reaction with aldehydes such as formaldehyde, along with other additives which might be desired, to produce useful polymeric products as described above.

Further water removal from the water-immiscible inert liquid medium can be easily accomplished and the water-immiscible liquid medium recycled for re-use. This is quite advantageous economically.

The process of this invention also provides the advantage that contact between the metal halide and the amide is facilitated and the reaction therebetween is quite rapid.

The following examples are given to illustrate the invention in greater detail without intending to limit the same. Unless otherwise indicated, all parts, percents, ratios and the like are by weight and all procedures were conducted at room temperature (about 20-30° C.) and atmospheric pressure.

EXAMPLE 1

A clean and dry glass-lined reactor equipped with an agitator, inlets for the introduction of solid and liquid reactants and an outlet for removal of any gaseous materials by-produced was charged with 46 g of dry benzene. Then, 45.6 grams of urea, as a finely divided solid, was added to the benzene in the reactor. The reactor was heated to approximately 40° C. and then 12.1 grams of titanium tetrachloride was added to the reactor over a 10 to 20 minute period, with the temperature being maintained at not above 40° C. Subsequently, the reaction system in the reactor was agitated for an additional 10 minutes after all of the titanium tetrachloride had been added. A yellow solid of the reaction product of the titanium tetrachloride and urea was formed as a slurry in the benzene.

Then, 31.7 grams of water was added to the benzene-reaction product slurry obtained and after all of the reaction product of the titanium tetrachloride and urea had been dissolved, about 15 minutes, a two-phase system was formed with the aqueous lower phase being substantially colorless.

In order to partially neutralize the aqueous solution of the reaction product of titanium tetrachloride and urea, 10.6 grams of sodium bicarbonate, as a finely divided solid, was added incrementally with agitation being continued. During the sodium bicarbonate addition, the pH of the reaction system was monitored and ultimately found to be less than 1.5. This constituted partial neutralization of the aqueous solution layer having dissolved therein the reaction product of the titanium tetrachloride and the urea.

After the partial neutralization described above had been completed, agitation was stopped and the reaction system was allowed to settle with a benzene layer forming as a upper layer and an aqueous solution containing the reaction product of titantium tetrachloride and the urea as the lower layer.

These two layers were then physically separated to obtain the reaction product of the titanium tetrachloride and urea as an aqueous solution.

REFERENCE EXAMPLE

The aqueous solution of the reaction product of titanium tetrachloride and urea produced in Example 1 above was employed in order to produce a metal-modified amide-aldehyde polymer in the following manner.

100 parts of the aqueous solution layer containing the titanium tetrachloride-urea reaction product produced in Example 1 above was mixed with 180 parts of a prepolymer composition having the following formulation at a temperature of 25° C.

| Prepolymer Composition | Parts by Weight |
|---|---|
| Melamine | 22.5 |
| Urea | 18.0 |
| Formaldehyde (37% by weight aqueous solution) | 116.0 |
| Methanol | 14.3 |
| $KNO_3$ | 9.1 |

A cured, thermoset resin with low shrinkage properties was obtained.

EXAMPLE 2

The procedures of Example 1 were repeated using an equivalent amount of toluene for the benzene used in Example 1 and substantially the same results were obtained.

EXAMPLE 3

The procedures of Example 1 were repeated utilizing an equivalent amount of xylene for the benzene employed in Example 1 and substantially the same results were obtained.

EXAMPLE 4

The procedures of Example 1 were repeated utilizing an equivalent amount of cyclohexane for the benzene and substantially the same results were obtained.

EXAMPLE 5

The procedures of Example 1 were repeated utilizing perchloroethyelene for the benzene, in an equivalent amount, and substantially the same results were obtained.

EXAMPLE 6

The procedures of Example 1 were repeated utilizing trichlorotrifluroethane, in an equivalent amount, for the benzene of Example 1 and substantially the same results were obtained.

EXAMPLE 7

The procedures of Example 1 were repeated utilizing 400 g of benzene, 565 g of urea, 183 g of zirconium chloride, 392 g of water and 132 g of sodium bicarbonate with the partial neutralization being to a pH of 2.5. Substantially the same results were obtained with the production of a reaction product of zirconium tetrachloride and urea in the aqueous solution layer produced.

While the invention has been described in detail and with respect to specific embodiments thereof, it will be apparent to one skilled in the art that various changes and modifications can be made therein without departing from the spirit and scope thereof.

What is claimed is:

1. A process for the preparation of a metal halide-amide reaction product which comprises
   (1) reacting in a water-immiscible inert liquid medium a halide of titanium, zirconium or hafnium with at least one amide having at least two replaceable hydrogen atoms selected from the group consisting of urea, a mono- or di-substituted urea, thiourea, guanidine or semicarbazide, to obtain a reaction product therebetween;
   (2) hydrolyzing the reaction product obtained in step (1) above with water to form an aqueous solution of said reaction product;
   (3) partially neutralizing the aqueous solution of said reaction product obtained in step (2) with a biacarbonate; and
   (4) recovering the metal halide-amide reaction product obtained.

2. The process of claim 1, wherein the molar proportion of the halide of titanium, zirconium or hafnium to the amide ranges from about 1:100 to about 1:2.

3. The process of claim 1, wherein the reaction in the water-immiscible inert liquid medium is conducted at a temperature of about 0° C. to about 40° C.

4. The process of claim 1, wherein said halide is a chloride.

5. The process of claim 4, wherein said chloride is titanium tetrachloride.

6. The process of claim 1, wherein said amide having at least two replaceable hydrogen atoms is urea.

7. The process of claim 1, wherein said water-immiscible inert liquid medium is an aromatic hydrocarbon, an aliphatic hydrocarbon, a halogenated derivative thereof or a mixture thereof.

8. The process of claim 7, wherein said aromatic hydrocarbon is benzene, toluene, xylene, ehtylbenzene, cumene, cymene or mesitylene, said aliphatic hydrocarbon is pentane, hexane, petroleum ether, legroin, kerosene or cyclohexane and said halogenated derivative thereof is methylene chloride, chloroform, carbon tetrachloride, trichloroethane, amyl chloride, chlorinated kerosene, chlorobenzene, dichlorobenzene, methylene bromide, bromobenzene, fluorobenzene, dibromotetrafluoroethane, perchloroethylene, fluorotrichloromethane, trichlorotrifluoroethene or difluorotetrachloroethane.

9. The process of claim 1, wherein the hydrolysis of the reaction product obtained in step (1) with water to form the aqueous solution of the reaction product is at a temperature of about 10° C. to about 60° C.

10. The process of claim 1, wherein the hydrolysis of the reaction product in the aqueous solution with water is using sufficient water to dissolve the reaction product.

11. The process of claim 1, wherein the said bicarbonate is selected from the group consisting of the sodium bicarbonate, potassium bicarbonate or ammonium bicarbonate.

12. The process of claim 1, wherein the partial neutralization is to the extent that about 0.4 to 0.6 times, on a molar basis, of the acidity is neutralized.

13. The process of claim 1, wherein the partial neutralization is conducted at a temperature of about 10° C. to 60° C.

14. The process of claim 1, wherein the recovery is by separating off the partially neutralized aqueous solution of the reaction product.

15. The process of claim 14, wherein said process further includes (5) removing water from the inert liquid media present after separation of the partially neutralized aqueous solution of the reaction product and (6) recycling said water-immiscible inert liquid media to step (1).

16. The process of claim 15, wherein said removing of the water is by azeotropically distilling.

17. The process of claim 2, wherein the molar proportion of the halide to the amide ranges from 1:35 to 1:3.5.

18. The process of claim 1, wherein the weight ratio of the halide and the amide to the water-immiscible inert liquid medium is about 1:0.8 to 1:4.

* * * * *